US008916983B2

(12) United States Patent
Marya et al.

(10) Patent No.: US 8,916,983 B2
(45) Date of Patent: Dec. 23, 2014

(54) ELECTROMAGNETIC HARVESTING OF FLUID OSCILLATIONS FOR DOWNHOLE POWER SOURCES

(75) Inventors: Manuel P. Marya, Sugarland, TX (US); Gary L. Rytlewski, League City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 732 days.

(21) Appl. No.: 12/556,655

(22) Filed: Sep. 10, 2009

(65) Prior Publication Data

US 2011/0057449 A1 Mar. 10, 2011

(51) Int. Cl.
*F03B 13/00* (2006.01)
*H02P 9/04* (2006.01)

(52) U.S. Cl.
USPC ........................................................ 290/43

(58) Field of Classification Search
USPC ............................ 290/54, 43; 166/66.5, 65.1
See application file for complete search history.

(56) References Cited

U.S. PATENT DOCUMENTS

| | | | | |
|---|---|---|---|---|
| 3,938,020 | A | 2/1976 | Bourke | |
| 4,387,318 | A | 6/1983 | Kolm et al. | |
| 5,713,728 | A * | 2/1998 | Salamey | 417/418 |
| 5,839,508 | A | 11/1998 | Tubel et al. | |
| 6,109,888 | A * | 8/2000 | Marshall | 417/413.1 |
| 6,253,847 | B1 | 7/2001 | Stephenson | |
| 6,504,258 | B2 | 1/2003 | Schultz et al. | |
| 6,515,592 | B1 | 2/2003 | Babour et al. | |
| 6,532,740 | B1 | 3/2003 | Sullivan | |
| 6,768,214 | B2 | 7/2004 | Schultz et al. | |
| 6,842,006 | B2 | 1/2005 | Conti et al. | |
| 6,848,503 | B2 * | 2/2005 | Schultz et al. | 166/66.5 |
| 6,856,036 | B2 | 2/2005 | Belinsky | |
| 7,112,892 | B2 * | 9/2006 | Mahowald | 290/54 |
| 7,116,036 | B2 | 10/2006 | Balasubramaniam et al. | |
| 7,168,487 | B2 | 1/2007 | Salamitou et al. | |
| 7,190,084 | B2 * | 3/2007 | Hall et al. | 290/1 R |
| 7,199,480 | B2 * | 4/2007 | Fripp et al. | 290/1 R |
| 7,242,103 | B2 | 7/2007 | Tips | |
| 7,246,660 | B2 * | 7/2007 | Fripp et al. | 166/65.1 |
| 7,295,013 | B2 | 11/2007 | Conti et al. | |
| 7,423,874 | B2 * | 9/2008 | Ouyang | 361/699 |
| 8,035,244 | B2 * | 10/2011 | Sutherland | 290/54 |
| 2003/0098588 | A1 * | 5/2003 | Yazawa et al. | 290/43 |
| 2005/0146140 | A1 * | 7/2005 | Koslover et al. | 290/42 |
| 2005/0167987 | A1 * | 8/2005 | Perlo et al. | 290/1 R |
| 2005/0200210 | A1 | 9/2005 | Kotonis et al. | |
| 2006/0063522 | A1 | 3/2006 | McFarland | |

(Continued)

FOREIGN PATENT DOCUMENTS

| | | | |
|---|---|---|---|
| CA | 2627854 | A1 | 8/2001 |
| GB | 1116451 | A | 6/1968 |

(Continued)

*Primary Examiner* — Julio Gonzalez R.

(74) *Attorney, Agent, or Firm* — David J. Groesbeck; Brandon S. Clark

(57) ABSTRACT

A downhole tool for generating power is provided that includes a conductive fluid disposed downhole within a tubular member, an energy harvesting apparatus, and a pressure changing apparatus. The energy harvesting apparatus includes a magnet configured to generate a magnetic field and an electrical conductor configured to move with respect to the magnet. The pressure changing apparatus is configured to supply a differential pressure across the energy harvesting apparatus, such that the electrical conductor moves with respect to the magnet.

1 Claim, 8 Drawing Sheets

(56) References Cited

U.S. PATENT DOCUMENTS

| | | | | |
|---|---|---|---|---|
| 2006/0086498 | A1 | 4/2006 | Wetzel et al. | |
| 2006/0130476 | A1 | 6/2006 | Fitch et al. | |
| 2006/0175838 | A1 * | 8/2006 | Tips | 290/1 R |
| 2006/0175937 | A1 | 8/2006 | Clingman et al. | |
| 2009/0134631 | A1 * | 5/2009 | Guerrero et al. | 290/1 R |

FOREIGN PATENT DOCUMENTS

| | | | |
|---|---|---|---|
| GB | 2419362 | A | 4/2006 |
| WO | 2006093790 | | 9/2006 |
| WO | 2006093790 | A2 | 9/2006 |
| WO | 2008008680 | A1 | 1/2008 |

* cited by examiner

ELECTROMAGNETIC HARVESTING OF FLUID OSCILLATIONS FOR DOWNHOLE POWER SOURCES

BACKGROUND

1. Field of the Disclosure

Embodiments described herein generally relate to a power generating tool that utilizes fluid oscillations. More particularly, embodiments described herein relate to a tool used downhole during oil and gas exploration that generates power, although embodiments may not be limited to these generalizations.

2. Description of Related Art

The following descriptions and examples are not admitted to be prior art by virtue of their inclusion in this section.

A wide variety of downhole well tools are electrically powered. These tools include, for example, flow control devices, sensors, optical communication devices, packers, telemetry devices, and the like. Currently available devices, as well as new downhole technologies being developed, are more commonly using electricity to perform their specific functions.

Typically, electrical power has been supplied to downhole tools using conventional methods such as with batteries and/or electrical lines. However, some of the batteries currently used may not operate for an often longer required length of time or at the extreme conditions of a wellbore environment, such as higher downhole temperatures and pressures. Further, a downhole location may make battery replacement difficult and time consuming, in addition to expensive if a work over rig is required or if production from the well is interrupted. In some cases, long electrical lines have been known to interfere with flow access and run the risk of being damaged, given their positions inside and/or outside a tubing string. As such, an ability to generate power downhole may help in reducing the need for batteries downhole, or at least provide the ability to recharge existing downhole batteries.

SUMMARY OF INVENTION

In one aspect, one or more embodiments of the present invention may relate to a downhole tool for generating power. The downhole tool may comprises a conductive fluid disposed downhole within a tubular member, an energy harvesting apparatus, and a pressure changing apparatus. The energy harvesting apparatus may comprises a magnet configured to generate a magnetic field and an electrical conductor configured to move with respect to the magnet. The pressure changing apparatus may be configured to supply a differential pressure across the energy harvesting apparatus, such that the electrical conductor moves with respect to the magnet.

In another aspect, one or more embodiments of the present invention may also relate to a downhole tool for generating power. The downhole tool may comprises a tubular member configured to have a fluid flow therein, an energy harvesting apparatus, and a pressure changing apparatus. Embodiments of the energy harvesting apparatus may comprise a magnet configured to generate a magnetic field and an electrical conductor configured to move with respect to the magnet. The energy harvesting apparatus may be disposed adjacent to the tubular member, configured to receive a pressure change inflow from the tubular member on a first side thereof, and configured to receive a pressure change outflow from the tubular member on a second side thereof. Embodiments of the pressure changing apparatus may be configured to supply a differential pressure across the energy harvesting apparatus, such that the electrical conductor moves with respect to the magnet.

In another aspect, one or more embodiments of the present invention may relate to a method for generating power downhole. The method may comprise disposing an energy harvesting apparatus down hole, and disposing a pressure changing apparatus downhole. The energy harvesting apparatus may comprise a magnet configured to generate a magnetic field, and an electrical conductor configured to move with respect to the magnet. Further, the energy harvesting apparatus may be disposed adjacent to the tubular member, configured to receive a pressure change inflow from the tubular member on a first side thereof, and configured to receive a pressure change outflow from the tubular member on a second side thereof. The pressure changing apparatus may be configured to supply a differential pressure across the energy harvesting apparatus, such that the electrical conductor moves with respect to the magnet.

BRIEF DESCRIPTION OF DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description. In the specification and appended claims: the terms “connect”, “connection”, “connected”, “in connection with”, “connecting”, “couple”, “coupled”, “coupled with”, and “coupling” are used to mean “in direct connection with” or “in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

The movement of fluid in a downhole environment may be exploited to generate electrical power. The principles of Faraday describe how the motion of a magnet within a coil of wire induces an electric current. The reverse is also true; the motion of a electrical conductor within a magnetic field will induce an electrical current. In a downhole environment, fluid mechanics principles may be used to generate the motion, or displacement, of an electrical conductor within a magnetic field, or vice-versa.

Figure 1:
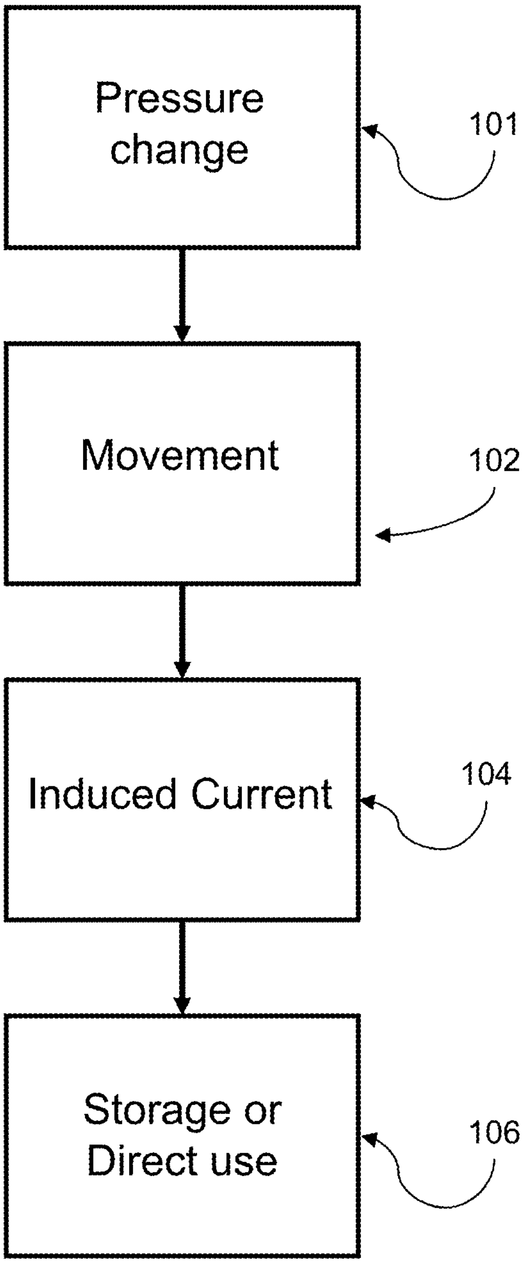
FIG. 1 shows a flow chart in accordance with one or more embodiments of the present invention.

In one aspect, embodiments disclosed herein may generally relate to a power generating tool that may be used downhole, such as within a wellbore. The downhole tool may include a pressure changing apparatus and an energy harvesting apparatus. The energy harvesting apparatus may include a magnetic field and an electrical conductor. Referring to FIG. 1, fluid mechanics principles are used to create a pressure change 101 in a downhole environment. The pressure change 101 is then used to create a fluid displacement 102 and a movement of an electrical conductor with respect to a magnetic field. This movement, or displacement 102, of an electrical conductor with respect to a magnetic field results in electromagnetic forces and inductive currents 104. As such, the induced currents 104 may be utilized to power electrical devices and/or may be stored 106 for future use downhole.

Figure 2:
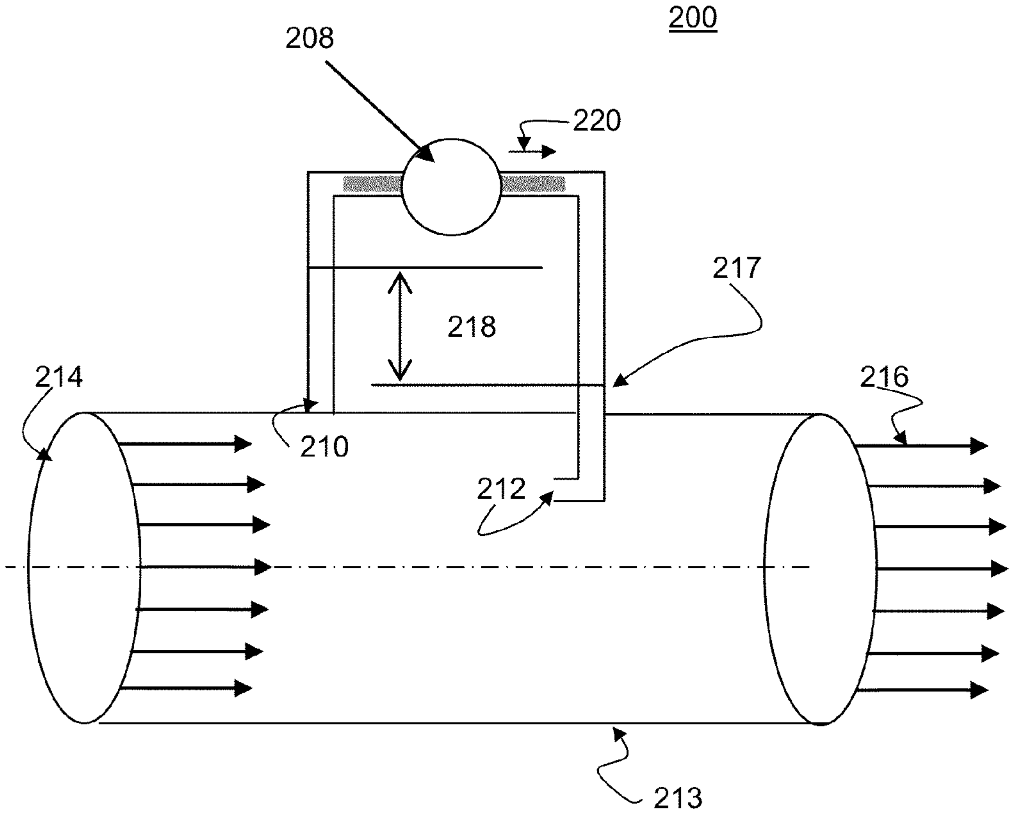
FIG. 2 shows a schematic diagram of a downhole tool in accordance with one or more embodiments of the present invention.

Referring now to FIG. 2, a schematic diagram of a downhole tool 200 in accordance with one or more embodiments is shown. The downhole tool 200 includes a fluid inflow 214 and fluid outflow 216. A pressure changing apparatus 217 is then connected to a downhole tubular 213. As shown in this embodiment, a pressure differential 218 is created by a Pitot tube fluid intake 212 being exposed to and facing a moving fluid. The Pitot tube fluid intake 212 may be substantially parallel to a central axis of the downhole tubular 213. However, those having ordinary skill in the art will appreciate the present disclosure is not limited to a Pitot tube, as will be discussed further with regard to FIG. 3.

In this embodiment, the Pitot tube includes the fluid intake 212 and a fluid outtake 210 from the downhole tubular 213. The fluid, entering from the downhole tubular 213 into the pressure changing apparatus 217, moves into the fluid intake 212. The fluid intake 212 may be closer to a central axis of the downhole tubular 213 than the fluid outtake 210, thereby creating a pressure change. For example, such apparatuses have been used for estimating fluid velocity. The pressure change creates fluid displacements across a electromagnetic harvesting device 208. The displacements may then be used to by the energy harvesting apparatus 208 to generate a current 220 therein, such as through the method described in FIG. 1, to generate power within the electromagnetic harvesting apparatus 208.

The electromagnetic harvesting apparatus 208 uses the motion of the fluid displacement to generate electrical power. In one or more embodiments, the energy harvesting apparatus may be an apparatus such as an electromagnetic pump used in reverse action. Typically, electromagnetic pumps use an electromagnetic field to propel a conductive fluid. However, in one embodiment of the present disclosure, the moving conductive fluid may generate an electromagnetic field that provides a current. As such, the movement of the conducting fluid within the electromagnetic pump results in power generation. An electromagnetic pump has the advantage over a mechanical pump in that there are no moving parts, shafts, or seals. Electromagnetic pumps are also known to emit no noise or vibration, and further suffer no performance degradation over time.

In one or more of the embodiments described herein, the fluid moving in the downhole tubular 213 may be a conducting fluid, such as a liquid metal. Examples of a conducting fluid include gallium and/or eutectic alloys of gallium, such as gallium with indium, zinc, tin, etc. Other examples include fluids used in liquid metal cooling devices, thermometers, and switches. In liquid metal cooling devices, the liquid metals may be propelled by one or more electromagnetic pumps.

Figure 3:
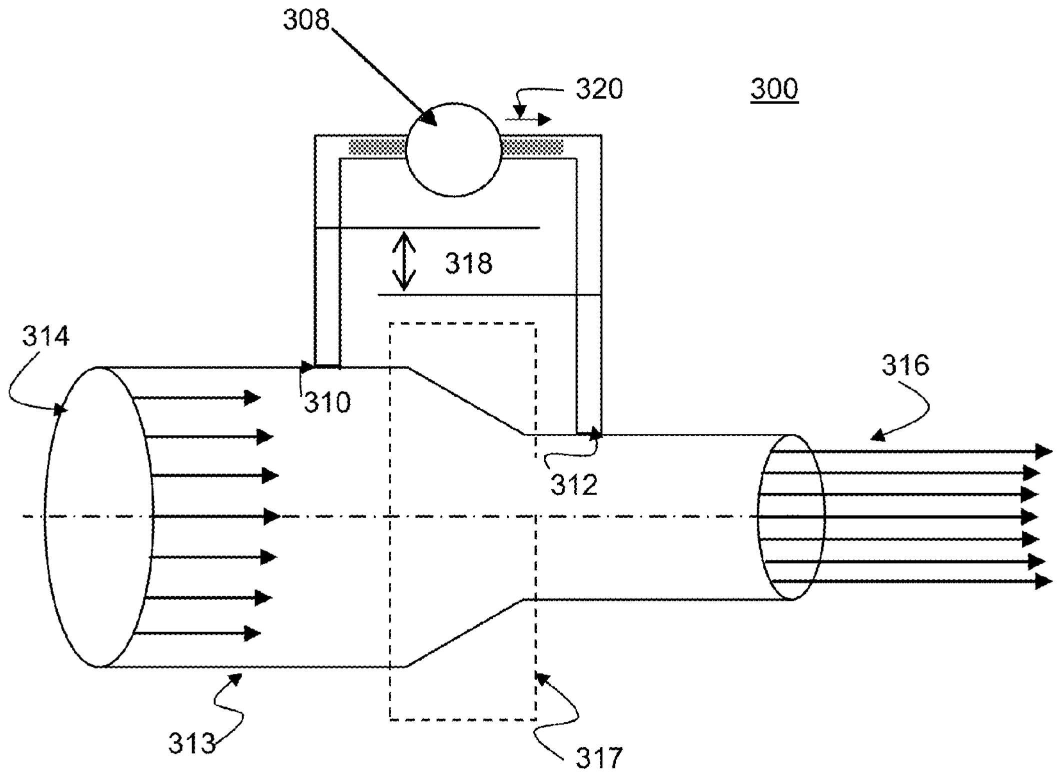
FIG. 3 shows a schematic diagram of a downhole tool in accordance with one or more embodiments of the present invention.

Referring now to FIG. 3, a schematic diagram of a downhole tool 300 in accordance with one or more embodiments is shown. The downhole tool 300 includes a fluid inflow 314 and an accelerated fluid outflow 316. A pressure changing apparatus 317 is connected to a downhole tubing 313. The pressure changing apparatus 317 is used to create a pressure differential 318 across an energy harvesting apparatus 308. In this embodiment, the pressure changing apparatus 317 is a venturi, a constricted section of pipe, or a reduction in the tubular diameter. The reduced diameter causes the fluid velocity to increase, and as a result the pressure changes. Accordingly, the pressure differential 318 in this embodiment may be created by the venturi 317 within a wellbore. The venturi may then cause the accelerated outflow 316 within the downhole tubing 313.

Those having ordinary skill in the art, however, will appreciate the present disclosure is not limited to a venturi as a pressure changing device to change the fluid pressure within a wellbore. Other examples of a pressure changing apparatus for use in a downhole environment in accordance with embodiments disclosed herein may include, but are not limited to, a Pitot tube (as described above), an orifice plate, and/or a Dall tube.

Referring still to FIG. 3, the venturi 317 includes a fluid intake 312 and a fluid outtake 310. The fluid intake 312 is connected to the tubular member 313 after the venturi 317, and the fluid outtake 310 is connected to the tubular member 313 before the venturi 317. The accelerated out flow 316 causes fluid from the downhole tubular 313 to move into the fluid intake 312, thereby creating the pressure differential 318 between the fluid intake 312 and fluid outtake 310. As such, the pressure differential 318 creates a displacement, or movement, of the fluid across a electromagnetic harvesting apparatus 308. The movement of the fluid may then be used by the energy harvesting apparatus 308 to generate an electrical current 320.

Figure 4:
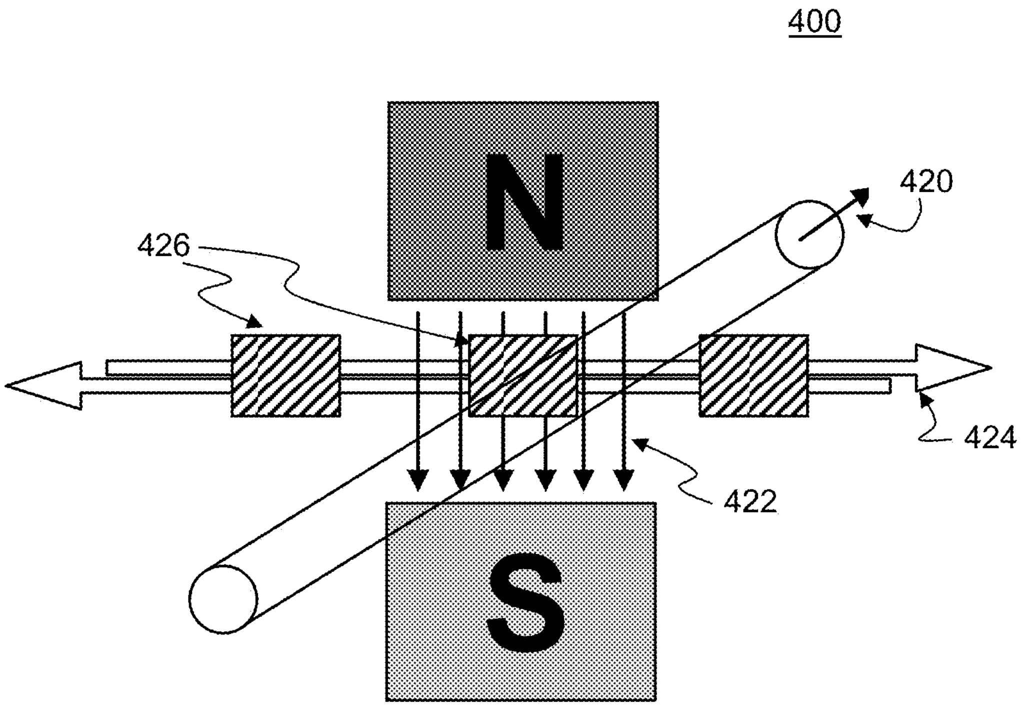
FIG. 4 shows a schematic diagram of an electromagnetic harvesting device in accordance with one or more embodiments of the present invention.

Referring now to FIG. 4, a schematic diagram of an electromagnetic harvesting device 400 in accordance with one or more embodiments is shown. Elements of the electromagnetic harvesting apparatus 400 may include a generated magnetic field 422, for example, created by two or more permanent magnets (as shown). The apparatus may also include two or more electrical conductors 426 disposed within the magnetic field 422 and in contact with a moving conductive fluid 424. The magnetic field 422 and electrical conductors 426 are preferably oriented at a right angle to each other. The electrical conductors 426 may then be part of an electrical circuit for harvesting power. The moving conductive fluid 424 may then be disposed across the gap between the electrical conductors 426 to create a continuous, uninterrupted current path 420.

Embodiments of a electromagnetic harvesting device described herein may be influenced by the following qualitative relationships:

$$I \propto \frac{\rho r D}{B} \frac{dv}{dt}$$

$$EMF \propto DBv$$

$$P \propto \rho r D^2 v \frac{dv}{dt}$$

In the preceding equations, α designates "proportional to," I is the induced current, B is the magnetic field strength, and EMF is the electromotive force (voltage) associated with the induced current. The physical characteristics are defined by D, the diameter of the fluid flow at an electrical conductor and r, the contact radius of the electrical conductor. The fluid velocity is v, and dv/dt is the rate of change of the fluid velocity. The equations above relate to one or more embodiments that may include a conducting fluid. The variable ρ is the density of the conducting fluid.

The use of a conducting fluid, such as a liquid metal, in the downhole electromagnetic harvesting devices described herein may possess several advantages. For example, the use of a conducting fluid may provide stable properties at low and elevated temperatures, and/or stable properties over long periods of time. A high electrical conductivity of the fluid may also make additional electromagnetic pumping possible.

The parameters included above are not meant to be exhaustive, but are merely included to summarize some of the parameters that may influence power generation in the present disclosure. As such, the higher the density ρ of the conducting fluid, the more power P that may be generated. For example, a liquid metal such as gallium alloyed with heavier elements, such as indium, will be denser and less viscous than only gallium alone. The density ρ may contribute directly to the operational efficiency to the electromagnetic harvesting device, such as by increasing the power P.

In general, the greater the surface area of the electrical conductor r within the liquid metal, the more current and power that may be harvested. Thus, it may be advantageous to include a plurality of electrical conductors to enhance energy recovery, as will be described in further embodiments.

A large flow diameter D, along with a rapidly circulating fluid v, may also be desirable. The product of the diameter D and velocity v of the fluid may represent the flow rate and be substantially constant. For example, a high fluid velocity v occurs when the flow diameter is small, and vice-versa. Large rates of changes in the fluid velocity dv/dt may also be desirable. This may occur in small diameter tubes, and locations of high pressure changes. For example, high pressure changes occur when the diameter of the downhole tubulars change and/or when the fluid direction changes. As such, this change in fluid velocity dv/dt may provide for suitable locations in well completions to generate power P.

As previously stated, the relationships above offer a simplified representation of some embodiments disclosed herein. Other parameters that may contribute to the efficiency of various embodiments, that are not represented in the relationships above, include the frictional forces between the liquid and wall conduit. Frictional forces may decrease the overall efficiency of the apparatus, and therefore it may be advantageous to minimize such contributions. In one embodiment, the frictional forces may be reduced by the presence of a non-wetted, or non-stick, conducting fluid. For example, some embodiments may use liquid metal or liquid metal alloys in a non-stick coated tube. Examples of non-stick coatings include, but are not limited to, diamond like carbon coating, poly-disulfide coatings, and fluoro-polymer embedded epoxy type coatings.

Figure 5A:
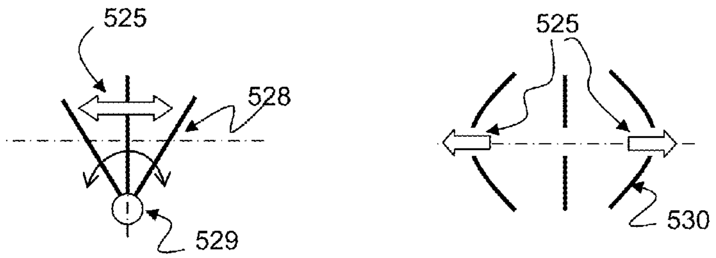
FIGS. 5A and 5B show a schematic diagram of an electromagnetic harvesting device in accordance with one or more embodiments of the present invention.
Figure 5B:
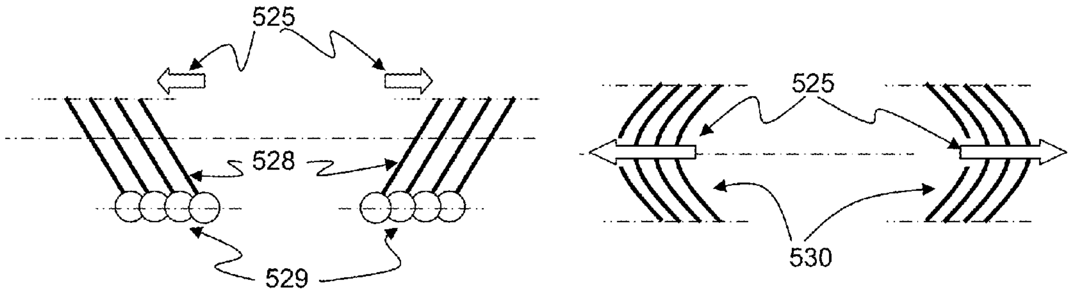

Referring now to FIGS. 5A and 5B, a schematic diagram of components of an electromagnetic harvesting device in accordance with one or more embodiments described herein is shown. In FIGS. 5A and 5B, the electrical conductors are a moving metallic component, in which a conducting fluid may not be necessary. However, embodiments described herein may be complemented by using a conducting fluid to create a more powerful and efficient power source.

As such, FIG. 5A shows a single blade or membrane 528 and diaphragm 530 in different positions relative the fluid flow direction 525. The oscillating blade or membrane 528 is attached at a pivot point 529 within a magnetic field. As shown, one membrane 528 or diaphragm 530 may be placed directly within the fluid flow 525 to capture fluid oscillations. The fluid flow 525 may cause the membrane 528 or diaphragm 530 to move, thus creating an electromotive force and an induced current that may be used as a downhole power source.

Further, FIG. 5B discloses similar embodiments with multiple blades or membranes 528 that may be included and move together with the liquid flow 525 to form a larger power source. Similar to FIG. 5A, FIG. 5B also discloses multiple membranes 530 oscillating in different flow directions 525. The blades or membranes 528 and/or diaphragms 530 may be made from conducting materials, for example metals, alloys, and/or their composites. Additionally, one of ordinary skill in the art will appreciate that the above embodiments are not limited to only blades, membranes, diaphragms, or combinations thereof. For example, the electrical conductors may be designed with an optimal number, geometric shape, and/or placement of perforations to further enhance lateral displacements, thereby enhancing power generation.

Figure 6A:
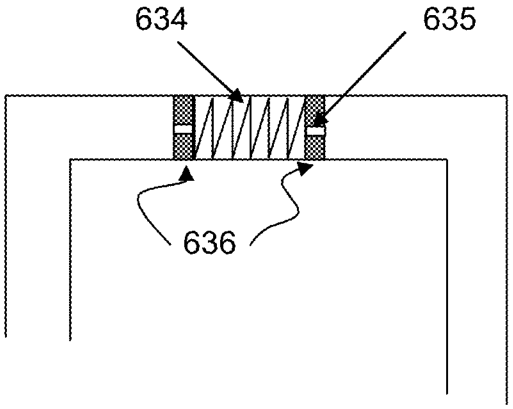
FIGS. 6A and 6B show a schematic diagram of components of an electromagnetic harvesting device in accordance with one or more embodiments of the present invention.
Figure 6B:
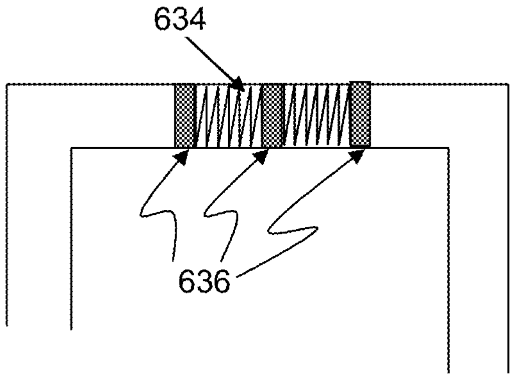

Referring now to FIGS. 6A and 6B, a schematic diagram of components of an electromagnetic harvesting device in accordance with one or more embodiments described herein is shown. Similar to embodiments previously disclosed, the embodiments described herein include a plurality of electrical conductors 636 attached by a spring 634. The electrical conductors 636 may include a perforation 635 that allows the liquid to flow through the conductors 636, thereby facilitating movement of the electrical conductor within the magnetic field. FIG. 6A shows a specific embodiment with two conductors 636 connected by a single spring 634. FIG. 6B shows a specific embodiment containing three electrical conductors 636 connected by two springs 634. The electrical conductors 636, as well as the springs 634, may be conducting in nature, such as being formed from a metal. Other embodiments may include more than two differently shaped electrical conductors connected by multiple springs. Similar to previous embodiments, the electrical conductors move within the magnetic field, and thus, originate electrical power. Further, the electrical conductors may be disposed within a conductive fluid, such as for reasons previously described.

Figure 7:
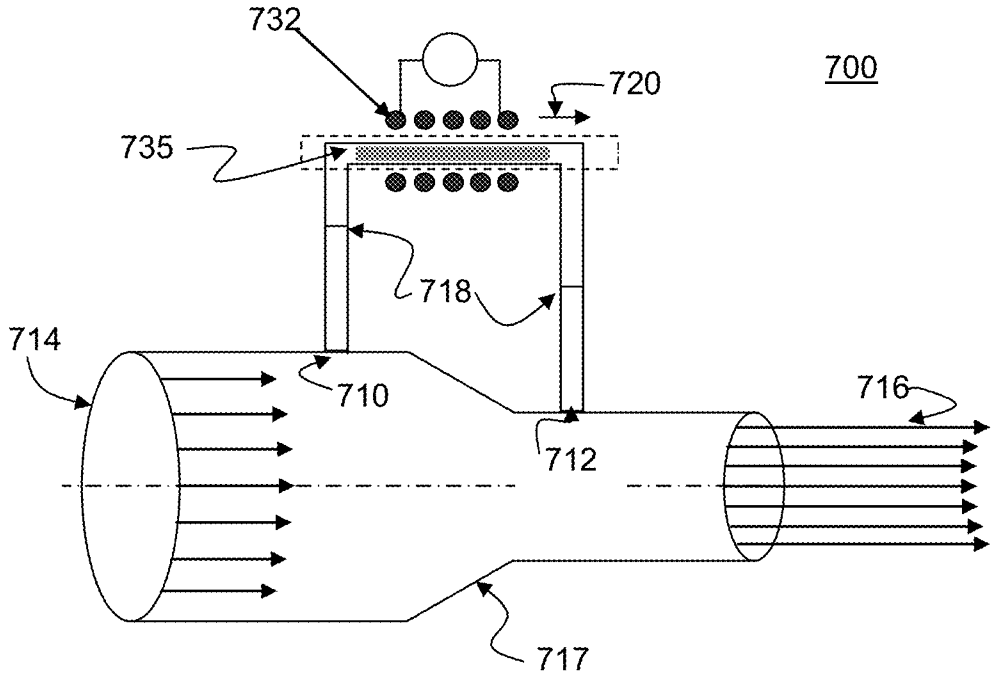
FIG. 7 shows a schematic diagram of a downhole tool in accordance with one or more embodiments of the present invention.

Referring now to FIG. 7, a schematic diagram of a downhole tool 700 in accordance with one or more embodiments described herein is shown. Similar to previous embodiments, the downhole tool 700 includes a fluid inflow 714 and an accelerated fluid outflow 716. As such, a pressure differential 718 is created by a venturi 717 across a fluid intake 712 and a fluid outtake 710. The venturi 717 thereby creates the accelerated outflow 716. The accelerated outflow 716 causes fluid to move into the fluid intake 712. The pressure differential 718 also creates displacements, or movements, of the fluid across an energy harvesting apparatus. The movement may then be used to by the energy harvesting apparatus to generate a current 720. In this embodiment, the energy harvesting apparatus includes one or more permanent magnets 735 moving within a prepositioned inductance coil 732. The energy harvesting apparatus may include one or more permanent magnets, in which the magnets may or may not be connected to each other. For example, one or more permanent magnets may be connected by a spring, as described in FIG. 6. Also, the fluid in the apparatus that causes the movement may be conducting, for example liquid metals, to reduce the friction in the tubing.

The shape of the permanent magnets may be selected such as to constrain the magnets in a specific place through the geometry of the electromagnetic harvesting device. For example, in FIG. 7, the shaded area of the one or more permanent magnets 735 will not allow the one or more permanent magnets 735 to exit through the fluid intake 712 or fluid outtake 710. The permanent magnets may also be blade shaped; such as analogous to the electrical conductors described in FIGS. 5A and 5B. The permanent magnets may also be cylindrically shaped (e.g. disc shaped), or any combination of analogous embodiments previously described.

Figure 8:
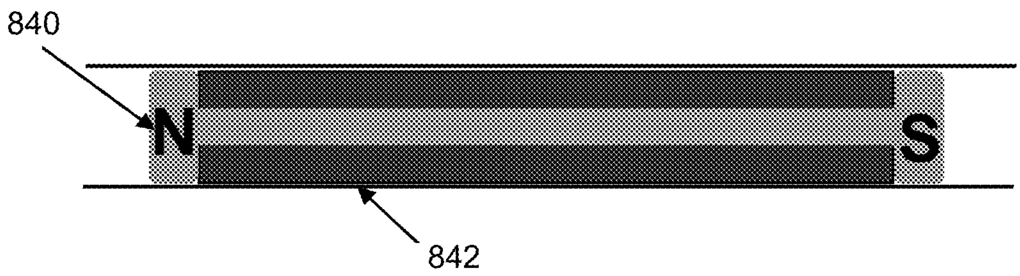
FIG. 8 shows a schematic diagram of components of an electromagnetic harvesting device in accordance with embodiments of the present invention.

Referring now to FIG. 8, a schematic of components of an electromagnetic harvesting device in accordance with embodiments described herein is shown. In this particular embodiment, a permanent magnet 840 oscillates within one or more inductance coils, as described previously. The permanent magnet 840 may be shaped to have a void between the magnet 840 and a tubing. The void may then contain a conducting fluid 842, such as to dispose the conducting fluid 842 between the permanent magnet 840 and the tubing.

The embodiments described herein for the electromagnetic generation downhole may be used to directly power downhole devices, such as sensors, optical light sources for communication devices, communication devices, thermoelectric coolers, and the like. In addition, multiple power generators described herein may be used in conjunction to power one or more energy demanding devices. The multiple power generators need not be in nearby locations through the use of proper wiring. Also, the embodiments described herein may be used to generate and store electricity in batteries or other energy storing means for future use, or to supplement other power sources used in downhole devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus to generate power downhole, comprising:

a tubular member configured to have a fluid flow therein; and an energy harvesting apparatus, comprising:

two or more permanent magnets connected together by a spring and configured to generate a magnetic field;

a liquid metal disposed around the two or more permanent magnets;

an inductance coil configured to move with respect to the two or more permanent magnets, wherein the inductance coil comprises at least one of a flexible diaphragm, a blade, or a flexible membrane;

a conductive fluid; and a pressure changing apparatus having a fluid intake and a fluid outtake, the pressure changing apparatus configured to supply a differential pressure across the energy harvesting apparatus such that the inductance coil moves with respect to the two or more permanent magnets;

wherein the energy harvesting apparatus is disposed adjacent to the tubular member and is configured to receive a pressure change inflow from the tubular member via the fluid intake on a first side thereof and is configured to receive a pressure change outflow from the tubular member via the fluid outtake on a second side thereof to induce a current flow at the inductance coil when the conductive fluid flows through the tubular member, the flow of current being enhanced by the conductivity of the conductive fluid.

* * * * *